(12) United States Patent
Raguenet et al.

(10) Patent No.: US 8,991,254 B2
(45) Date of Patent: Mar. 31, 2015

(54) LISTENING CLAMP FOR A VIBROACOUSTIC DIAGNOSIS TOOL USED MAINLY IN THE AUTOMOTIVE INDUSTRY

(75) Inventors: Wilfrid Raguenet, Fontenay aux Roses (FR); Gregory Autin, Cergy (FR); Valerie Aubois, Drancy (FR); Cyril Peronnet, Triel sur Seine (FR)

(73) Assignee: Peugeot Citroën Automobiles SA, Route de Gisy, Velizy Villacoublay (FR)

( * ) Notice: Subject to any disclaimer, the term of this patent is extended or adjusted under 35 U.S.C. 154(b) by 286 days.

(21) Appl. No.: 13/519,855

(22) PCT Filed: Dec. 20, 2010

(86) PCT No.: PCT/FR2010/052830
§ 371 (c)(1),
(2), (4) Date: Sep. 6, 2012

(87) PCT Pub. No.: WO2011/080466
PCT Pub. Date: Jul. 7, 2011

(65) Prior Publication Data
US 2012/0318063 A1 Dec. 20, 2012

(30) Foreign Application Priority Data

Jan. 4, 2010 (FR) .................................... 10 50016
Jan. 18, 2010 (FR) .................................... 10 50291

(51) Int. Cl.
*G01H 1/12* (2006.01)
*B25B 5/16* (2006.01)
(Continued)

(52) U.S. Cl.
CPC .. *G01H 1/12* (2013.01); *B25B 5/06* (2013.01); *B25B 5/163* (2013.01); *H04R 1/46* (2013.01)
USPC .............................................. 73/587; 73/593

(58) Field of Classification Search
CPC ... G01M 13/00; G01M 13/028; G01M 15/00; G01M 15/12; B25B 5/00; B25B 5/006; B25B 1/00; B25B 1/04; B25B 7/00; B25B 7/02; G01H 11/00
USPC ............ 73/578, 579, 584, 586, 591, 593, 587
See application file for complete search history.

(56) References Cited

U.S. PATENT DOCUMENTS

| 4,104,921 A | 8/1978 | Nissl |
| 4,189,655 A | 2/1980 | Bruel |

(Continued)

FOREIGN PATENT DOCUMENTS

| DE | 2703781 A1 | 8/1978 |
| DE | 3439004 A1 | 4/1986 |

(Continued)

OTHER PUBLICATIONS

International Search Report from corresponding International Application No. PCT/FR2010/052830, mailed Mar. 25, 2011.

*Primary Examiner* — Laura Martin
*Assistant Examiner* — Rose M Miller
(74) *Attorney, Agent, or Firm* — Polster, Lieder, Woodruff & Lucchesi, L.C.

(57) ABSTRACT

The invention relates to a clamp (10) which is used mainly in a vibroacoustic diagnosis tool during an automobile maintenance or after-sales assistance opération, including two hinged arms (11, 12), each comprising a jaw (13, 14) at one end and a handle (15, 16) at the other end. A pad (20) is mounted on each jaw (13, 14) via a ball-and-socket joint (21), such that the pad (20) ensures effective contact between the clamp (10) and the part being tested, and séparâtes the body of the clamp from the listening part. The invention is useful in the field of motor vehicles. The invention is also useful in the vibroacoustic diagnosis of motor vehicles or motor vehicle subunits.

16 Claims, 6 Drawing Sheets

(51) Int. Cl.
*B25B 5/06* (2006.01)
*H04R 1/46* (2006.01)

(56) References Cited

U.S. PATENT DOCUMENTS

| | | | |
|---|---|---|---|
| 4,790,191 A * | 12/1988 | Shultz, Jr. | 73/661 |
| 4,813,107 A | 3/1989 | Cetrone | |
| 4,827,771 A | 5/1989 | Cary et al. | |
| 5,435,185 A * | 7/1995 | Eagan | 73/587 |
| 6,708,587 B1 | 3/2004 | Noniewicz et al. | |
| 6,766,692 B1 * | 7/2004 | Eagan | 73/587 |
| 7,054,596 B2 * | 5/2006 | Arntz | 455/66.1 |
| 2004/0129080 A1 * | 7/2004 | Eagan | 73/578 |
| 2005/0098932 A1 | 5/2005 | Panosian | |
| 2009/0024268 A1 | 1/2009 | Eagan | |

FOREIGN PATENT DOCUMENTS

| | | |
|---|---|---|
| EP | 0570229 A2 | 11/1993 |
| FR | 2320536 A1 | 3/1977 |
| FR | 2334958 A1 | 7/1977 |
| FR | 2388259 A1 | 11/1978 |
| GB | 2172469 A | 9/1986 |
| WO | 2005118224 A1 | 12/2005 |

* cited by examiner

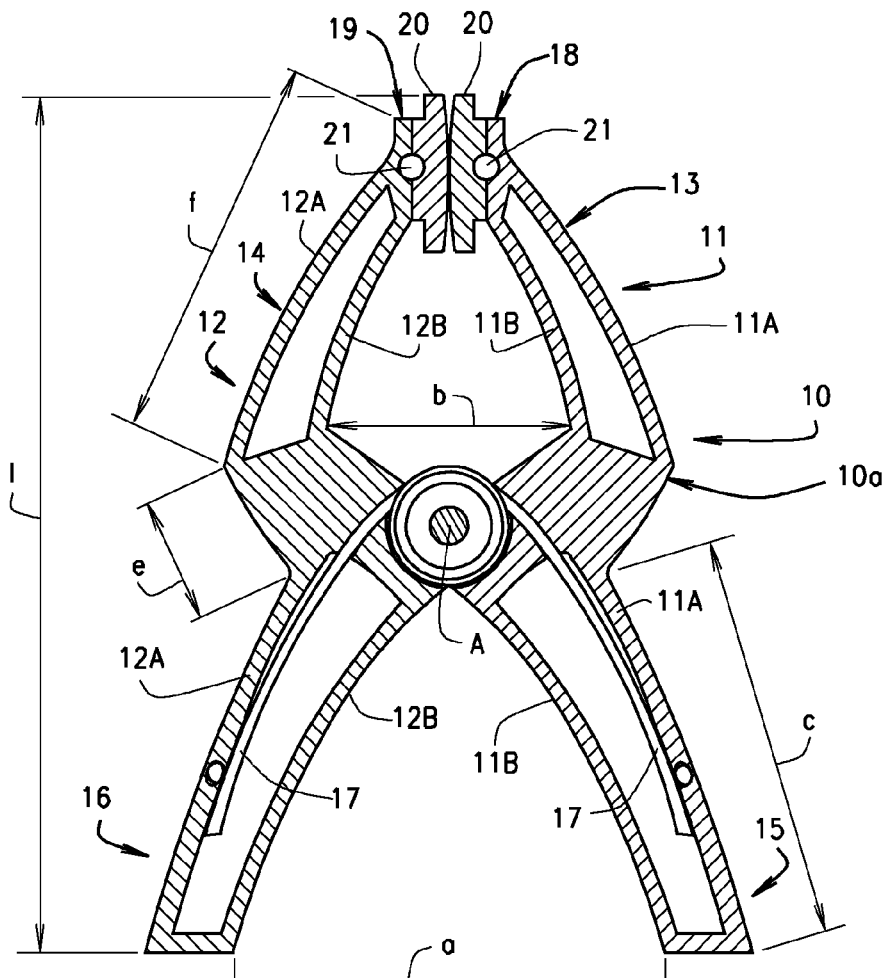
F I G . 2
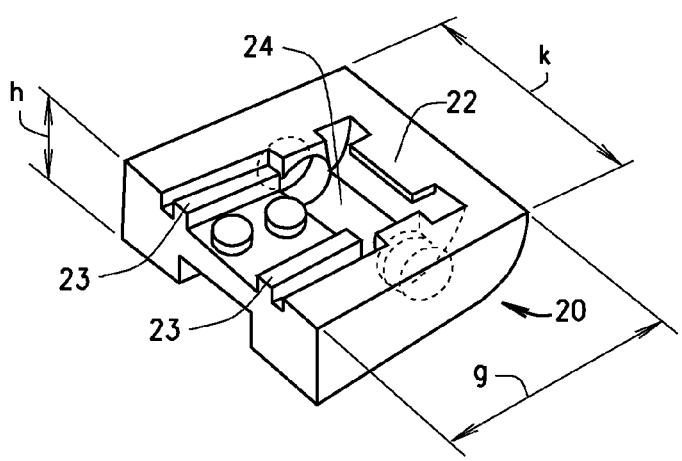
F I G . 3

LISTENING CLAMP FOR A VIBROACOUSTIC DIAGNOSIS TOOL USED MAINLY IN THE AUTOMOTIVE INDUSTRY

CROSS-REFERENCE TO RELATED APPLICATIONS

This application is the US National Stage under 36 U.S.C. §371 of International App. No. PCT/FR2010/052830 filed Dec. 20, 2010, and which claims priority to French App. Nos. 1050016 filed on Jan. 4, 2010 and 1050291 filed on Jan. 18, 2010, the contents of which (text, drawings and claims) are incorporated her by reference.

BACKGROUND

The present invention relates to a listening clamp for an acoustical vibration analysis tool, and an acoustical vibration analysis tool using such a listening clamp. These objects are used in particular during maintenance operations or after-sales service of automotive vehicles.

An acoustical vibration analysis tool comprises, in a known manner, a headset suitable for noisy environments, a microphone, four clamps for the detection of noise of a structural nature and a selector for immediate identification of the clamp nearest to the acoustical vibration phenomenon to be detected.

A known type of listening clamp comprises two pivotally connected arms, each comprising a jaw and a handle arranged on both sides of the pivot point. This kind of clamp comprises a return spring defining a closed rest position of the jaws. The jaws are rigid metallic bodies that directly grip on the element to be measured, such as the usual jaws of battery charge clamps. The sensor comprises a single axis accelerometer glued on one jaw at a distance from the contact zone. With such a clamp, only the vibrations produced in a direction perpendicular to the positioning of the accelerometer in the clamp are transformed into electric signals and can be heard by the operator. In addition, significant loudness and level variations are induced by the positioning of the clamp on the structure to be analyzed. The sensing quality is mediocre and makes diagnosis relatively difficult. In addition, with this type of clamp there is a risk of short circuits, which can be particularly inconvenient, in particular when the clamps are used with hybrid vehicles. Furthermore, the different types of applications of such a clamp in a vehicle, specifically on a powertrain group or on ground connections, require the use of several sets of listening clamps of different dimensions (in general the listening clamps of the same tool are of three different sizes), and on the same element of the structure, listening is chosen according to the selected clamp, which consequently creates difficulties and/or interpretation errors.

BRIEF SUMMARY

The goal is to provide a listening clamp for an acoustical vibration analysis tool, specifically a listening clamp which facilitates and improves, on the one hand, the acoustical vibration analysis performed during automotive maintenance or after-sales service operations, and on the other hand, the work of experts who can benefit jointly from a quick tool for investigating, analyzing and reporting, through the intermediary of registered sounds and videos.

Another goal is to supply a listening clamp with good frequency response, specifically between 0 and 4000 Hz, which has a good clamping opening and reduced overall dimensions, which avoids all risk of electrical short circuits, and which is inexpensive.

Finally, another goal is to provide an acoustical vibration analysis tool which allows for simultaneous monitoring of several instrumented clamps.

To achieve these goals, a listening clamp is provided for an acoustical vibration analysis tool. The listening claim is comprised of a body formed of two arms articulated around an axis of articulation, each arm comprising, in one extremity a jaw, and in the other extremity a handle. In this new clamp, a pad is mounted on each jaw through the intermediary of a swivel joint so that the pad ensures effective contact between the clamp and the structure being tested, while decoupling the body of the clamp from the sensing part.

According to one particular embodiment, the listening clamp comprises a spring, coaxial with the articulation axis of the two arms, which presses or urges the two jaws against each other in the absence of a clamp opening effort on the arms, whereby the spring has relatively high stiffness to limit non-linear effects.

According to another embodiment, the plastic material of the clamp's body has a Shore D hardness of about 80 and the pad has a Shore D hardness of about 40.

According to another embodiment, the length of the clamp is between 8.5 cm and 9 cm, while the distance between the two pads is about 3.5 cm when the clamp is open.

Also disclosed is an acoustical vibration analysis tool which comprises a headset suitable for noisy environments, a microphone for measuring airborne noise, a plurality of the listening clamps for measuring noise transmitted through structures, and a selection box used by an operator to immediately identify the listening clamp closest to the acoustical vibration phenomenon being investigated.

According to a particular embodiment, the acoustical vibration analysis tool comprises four of the listening clamps.

BRIEF DESCRIPTION OF THE DRAWINGS

Other goals, advantages and characteristics of the invention will appear in the following description of three preferred, non-limiting, embodiments, accompanied by drawings in which:

FIG. 2 shows in a schematic manner, a first illustrative embodiment of a listening clamp for an acoustical vibration analysis tool;

FIG. 3 is a schematic perspective view of a pad of the listening clamp of FIG. 2;

DETAILED DESCRIPTION

Figure 1:
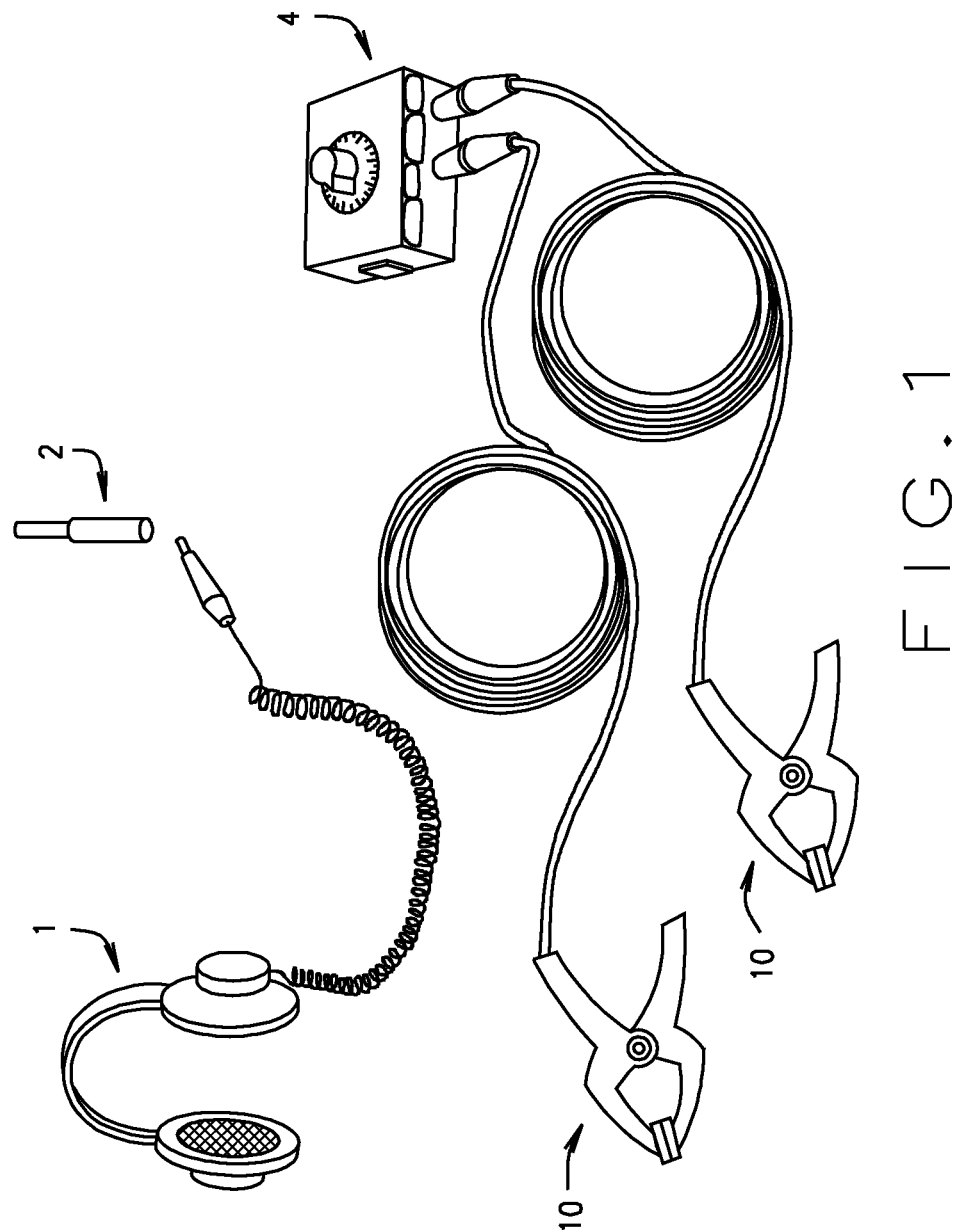
FIG. 1 shows the components of an acoustical vibration analysis tool.

FIG. 1 shows an acoustical vibration analysis tool suitable for diagnostics performed on automotive vehicles during maintenance and after-sales service operations by mobile teams called "after-sales service mobile teams." This type of tool is used to carry out vibration analysis of different sources of noise in order to identify dysfunctions in a vehicle (a certain number of breakdowns or dysfunctions induce acoustic and vibration symptoms).

The analysis tool comprises a headset 1 suitable for noisy environments, a microphone 2 suitable for measuring airborne noise (noise produced by a source that has no contact with the analyzed structure), a plurality of listening clamps 10 (here, four listening clamps 10) suitable for measuring structural noise (noise emitted by direct vibration of the analyzed structure), and a selection box 4 used by an operator to immediately identify the listening clamp closest to the acoustical vibration phenomenon to be studied. Headset 1, microphone 2 and the listening clamps 10 are equipped with plugs for connection to the selection box 4. On the basis of the electrical signals supplied by the microphone 2 and the listening clamps 10, the selection box 4 performs signal processing in order to generate an audible signal for each of the measured noises. The selection box 4 comprises a switch with which the operator can select a listening clamp 10 in order to hear the audible signal in the headset 1. By preference, all listening clamps 10 are of the same size.

Figure 9:
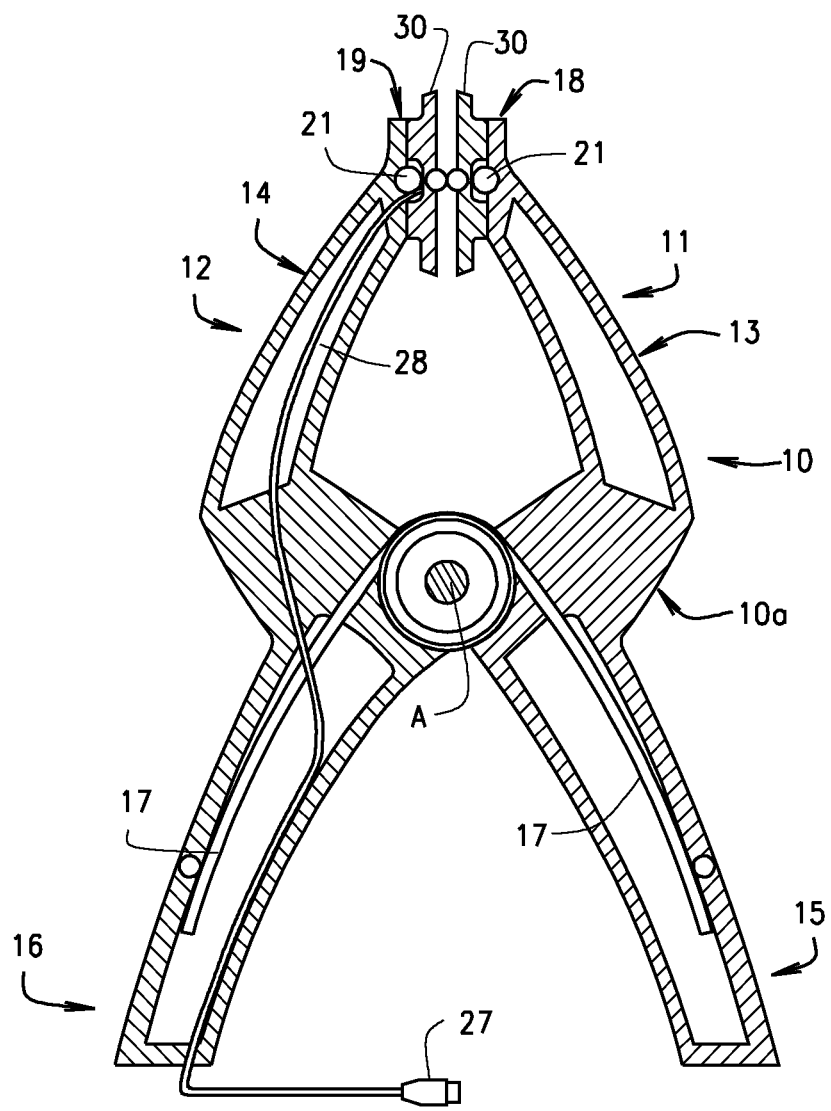
FIG. 9 is similar to FIG. 2 and represents a second illustrative embodiment of the listening clamp.

With the listening clamp 10, acoustical vibration analysis is possible by simultaneously listening to several clamps. With reference to FIGS. 2 and 9, the listening clamp 10 comprises a body 10a formed from two arms 11, 12 which are articulated around an articulation axis A, which is here in the median part of the arms 11, 12. In addition to the body 10a, the listening clamp 10 comprises two pads 20, 30 (here, identical). Each arm 11, 12 comprises, in one extremity, a jaw 13, 14 and in the other extremity a handle 15, 16. The distal extremities 18, 19 of jaws 13, 14 face each other and each comprises a pad 20.

The body 10a of the listening clamp is made of rigid plastic material so that no electrical short circuit can occur during the use of the listening clamp 10. The selected plastic material can be, for instance, an ABS type rigid elastomer (Acrylonitrile-Butadiene-Styrene Terpolymer) with a Shore D hardness of about 80.

Advantageously, the pads 20 are made of hard plastic material, for instance with a Shore D hardness of about 40.

The listening clamp 10 is lighter than the known state of the art clamps, due to the fact that the two arms 11, 12 are formed of perforated ribs 11A, 11B; 12A, 12B in order to make them lighter, except in their median part at the articulation A where, on the contrary, the arms are reinforced.

With reference to FIGS. 2 and 3, the listening clamp 10 can have the following dimensions:

Distance (a) between the arms 11, 12 at the location of the free extremity of the handles 15, 16: 4.5 cm;

Distance (b) between the arms 11, 12 at the base of the upper parts: 2.5 cm;

Length (c) of the handles 15, 16: 4 cm;

Length (e) of the median reinforced part of the arms 11, 12: 1.5 cm;

length (f) of the jaws 13, 14: 3.5 cm;

Length (g) of the pads 20: 1 cm;

Thickness (h) of the pads 20: 0.4 cm;

Length (k) of the pads 20: 1.5 cm;

Advantageously, the length of the listening clamp 10 is between 80 mm and 100 mm; by preference, its total length (l) is between 8.5 cm and 9 cm, and the distance between the two pads 20 of the listening clamp 10, when open, is about 3.5 cm. The listening clamp 10 therefore has a large clamping opening in a small footprint.

In spite of its small size, the listening clamp 10 has a center distance greater than the large clamp used in current state of the art diagnostic tools. It should be noted that the size of the clamp 10 is much smaller than the size of the average clamp used in currently known diagnostic tools. Because of the size and center distance of the clamp 10, the automotive listening device can be equipped with four clamps of the same size, which allows for simultaneous listening at different points without risking a degradation of the sensing quality by a structural response of a differently sized clamp.

Each pad 20 is mounted on the corresponding jaw 13, 14 through the intermediary of a swivel joint so that the pads 20 ensure effective contact between body 10a of the listening clamp and the structure to be analyzed and proper collection of vibrations. The pads are pivotally mounted to the jaws 13, 14 through the intermediary of pins 21, their pivoting angle can be, for example, about 30° to ensure optimal fixation and sensing. The swiveling articulation ensures that the pads 20 are decoupled from body 10a and provides a variable point of contact with the structure to be tested. Although in the illustrated examples the pads are pivotally mounted about an axis relative to jaws 13 and 14, it is also possible to mount the pads with two degrees of pivoting freedom relative to the jaws.

Figure 4:
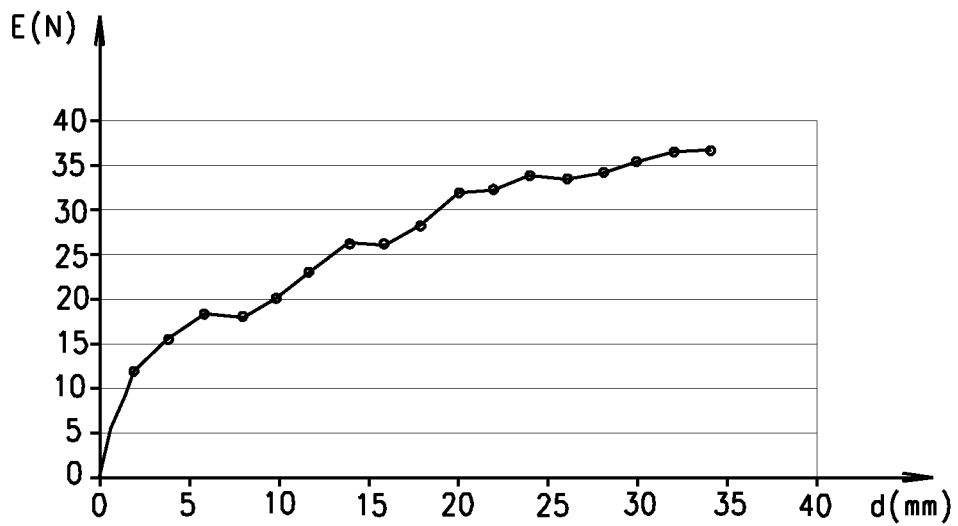
FIG. 4 is a representative graph of the elasticity characteristic of the spring of the listening clamp of FIG. 2.

The listening clamp 10 comprises a spring 17 (advantageously, a torsion spring coaxial with the axis of articulation A) which presses the two jaws 13 and 14 together in the absence of an opening force on handles 15 and 16. This spring 17 has relatively high stiffness to limit non-linear effects. The graph of FIG. 4 shows the forces "E" on spring 17 (expressed in Newtons) as a function of the displacements "d", (expressed in millimeters) which characterize spring 17. Clamp 10 offers a greater clamping force than prior art clamps.

Figure 5:
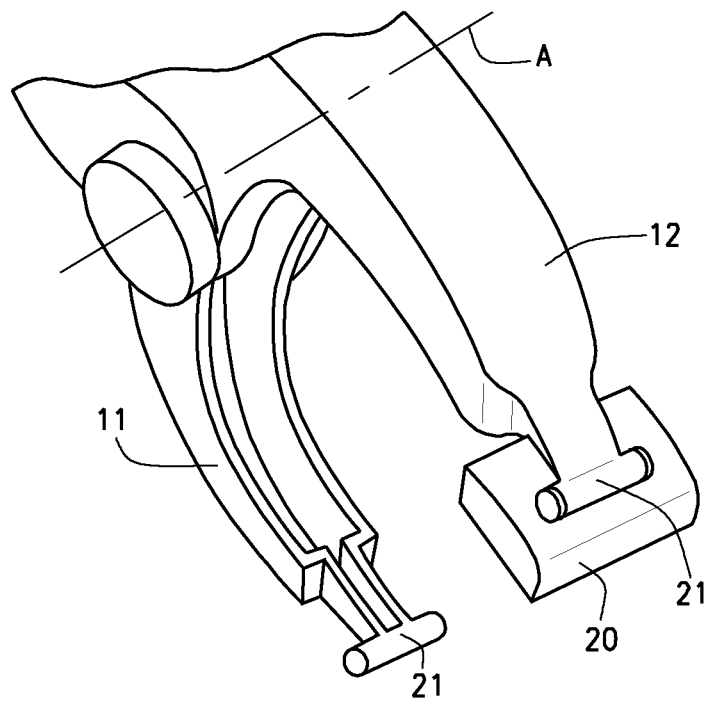
FIG. 5 is a perspective view of the listening clamp of FIG. 2 showing the connection of the pads.

FIG. 5 illustrates more precisely the geometry of the distal extremities 18, 19 of the jaws 13, 14 at the location of pins 21. As illustrated in FIG. 3, pad 20 of the first embodiment of the present invention comprises a cylindrical cavity 24 suitable for receiving pin 21 to form the articulation of pad 20 in body 10a of the listening clamp 10. Pin 21 is inserted in pad 20 by means of guides 23, and snaps in place in body 10a, and is retained in position due to tab 22 protruding above the cylindrical cavity 24.

Figure 6:
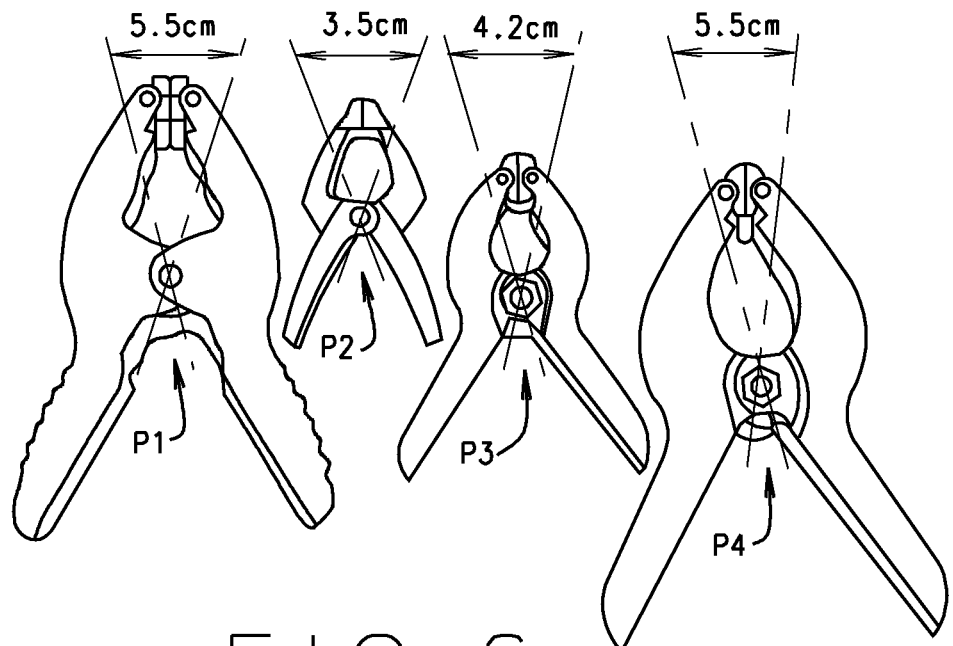
FIG. 6 shows four tested listening clamps of different type and form.

Vibration tests have been performed with the four types of listening clamps P1, P2, P3 and P4 shown in the drawing of FIG. 6. These four clamps, all made of plastic material in order not to cause electrical short circuits and risk for the users, have pads of hard plastic material mounted through the intermediary of swivel joints according to the above described example. The swivel joints of the pads provide, on the one hand, effective contact between the clamp and the part or assembly to be tested, and on the other hand, decoupling of the body of the clamp from the listening sensor part. These four types of clamps have different dimensions. These vibration tests have led to the conclusion that the most suitable clamp for the application of acoustical vibration analysis in maintenance or after-sales service is the clamp designated as P2.

Figure 7:
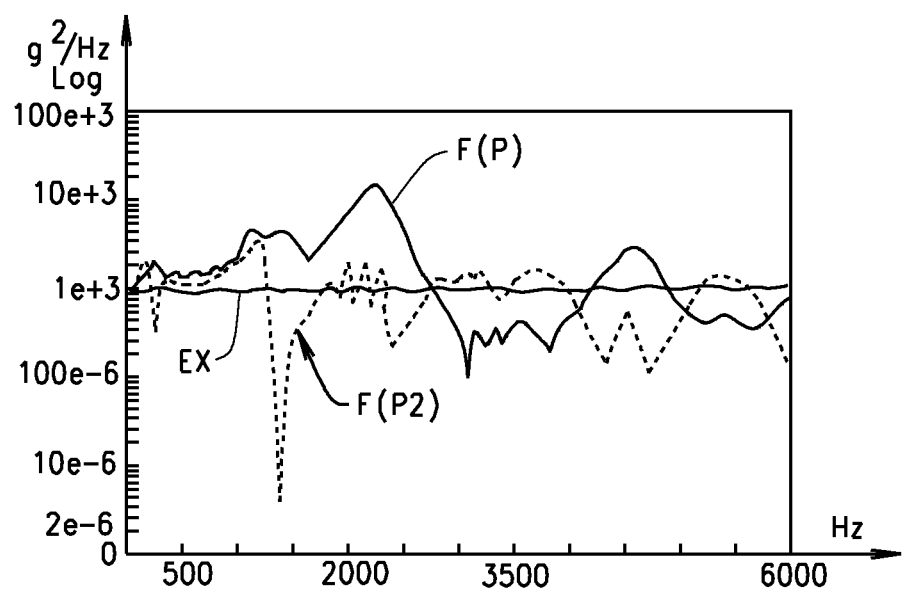
FIG. 7 is a representative graph of the vibratory response as a function of the frequency, in the case where the vibration sensor is placed in the jaws of the listening clamp.
Figure 8:
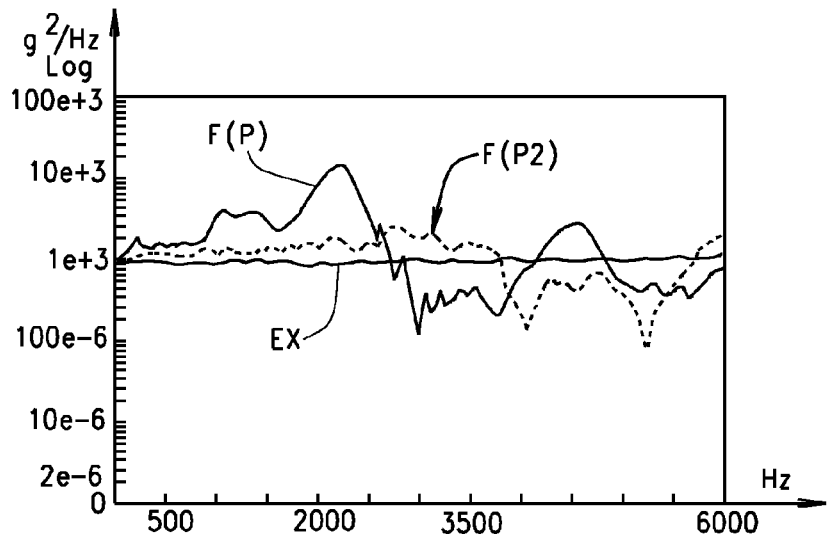
FIG. 8 is also a representative graph of the vibratory response as a function of the frequency, in the case where the vibration sensor is placed in the swiveling pad of the listening clamp.

FIGS. 7 and 8 are representative graphs of the vibration response (power spectral density or PSD), expressed conventionally in $g^2/Hz$, as a function of the frequency in Hertz (Hz). The tests of FIG. 7 were carried out with a sensor (accelerometer) placed in the jaws, and the tests of FIG. 8 with the sensor (accelerometer) in the swiveling pads. In these figures, the curves EX correspond with the excitation and are relatively "flat", the curves F(P2) represent the response of the clamp P2, and the curves F(P) represent the response of the average clamp (clamp P1 of FIG. 6).

It is important to note that when the accelerometer is located in the pad (FIG. 8), the over-voltages are highly dampened and the response is rather "flat" up to a frequency of about 3800 Hz. The listening clamp 10 according to the invention meets the requirement of a rather "flat" vibration response in the frequency range 0 to 4000 Hz.

FIG. 9 illustrates a listening clamp 10 according to a second embodiment in which one of the pads 30 includes an accelerometer (not illustrated in this figure) which is connected by means of an electrical cable 28 to a plug 27 suitable for being plugged into selection box 4. The electrical cable 28 can have a separation at the extremity of a handle 16 in the form of a freely moving connector. In this way, listening clamp 10 can be easily mounted on the structure to be tested without being bothered by the cable 28. Cable 28 can pass through the body 10a and be attached to it by means of a glued joint.

The clamp can also have an accelerometer mounted in one jaw, and the corresponding pad has a ball which protrudes relative to one pad, whereby the ball serves as collector of vibrations from an element clamped between the jaws of the clamp.

Figure 10:
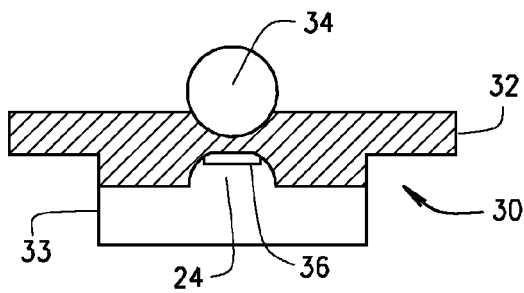
FIG. 10 is a cross-sectional view of a pad of the listening clamp of FIG. 9.

As more precisely illustrated in FIG. 10, the pads 30 comprise a flat plate 32 oriented towards the clamping space and a mounting part 33 in which the cylindrical cavity 24 for pin 21 is formed. The illustrated pad 30 comprises an accelerometer 36 placed in the bottom of the cavity 35. Depending on the desired accuracy of listening, an accelerometer 36 with one or more axes is used.

Plate 32 of pad 30 comprises a hole in the form of a partial sphere in which a ball 34 is housed. The ball 34 forms a collection element for structural noise. The ball 34 has, in practice, a part protruding, relative to plate 32, into free air, in order to come into contact with an element to be tested. Due to its spherical form, the ball 34 when contacting the structure to be tested collects vibration information independently of the orientation of pad 30 relative to this element. The flat part 32 of the mounting part 33 serves for transmission of vibration information collected by ball 34 to the accelerometer 36. In practice, the sensing quality obtained with this type of pad 30 is significantly improved: on the one hand the functions of vibration collection and transmission of the vibrations to the accelerometer are dissociated, and on the other hand the vibrations are transmitted from the element to the ball 23 which constitutes a collector with perfectly identified and controlled properties. Indeed, even when a three-axis accelerometer is used, in a listening clamp without a collecting ball, the amplitude of the measured signal remains heavily dependent on the orientation of the clamp.

Advantageously, the accelerometer 36 is disposed in vertical alignment with the ball 34. In this way, the collected vibrations undergo relatively limited distortions when they are transmitted to accelerometer 36. In the illustrated example, ball 34 is placed plumb with the cavity 24, in the bottom of which the accelerometer 36 is housed. In order not to undergo vibratory perturbations, the accelerometer 36 is, in practice, spaced from pin 21. Advantageously, for a multi-axis accelerometer, the summing circuit will be placed at a distance from accelerometer 36, inside the arm of the listening clamp 10. To avoid distortion phenomena, the phase shift between the different axes of the accelerometer 36 will be advantageously zero. Accelerometers such as the ones integrated in mobile phones can be used.

Ball 34 is advantageously made of stainless steel to optimize its life and the quality of vibration transmission. Ball 34 can have a diameter smaller than or equal to half the width of the flat part 32. The flat part 32 can have the following dimensions: length 25 mm, width 5 mm, and thickness slightly larger than the diameter of ball 34. The bore in the flat part 32 receiving the ball 34 can have a depth slightly smaller than the radius of ball 34. The ball 34 can be mounted in the flat part 32 by means of a rigid glue, thereby optimizing the transmission of vibrations. The glue used is advantageously resistant to high surface temperatures generally encountered with components of an internal combustion engine.

The flat part 32 and the mounting part 33 are advantageously formed from a monoblock elastomer pad. The hardness of this elastomer can be greater than or equal to 40 Shore (D) to optimize the transmission of vibrations towards the accelerometer. Advantageously, the hardness of ball 34 is at least 5 times greater than the hardness of the pad.

Figure 11:
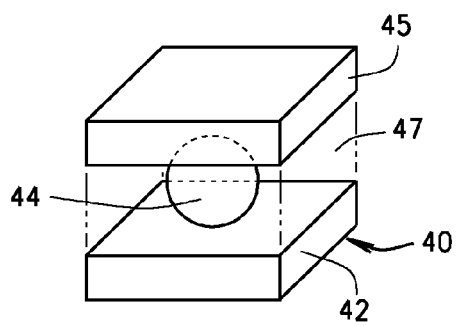
FIG. 11 is a schematic perspective view of the structure of a pad of a listening clamp according to a third embodiment.
Figure 12:
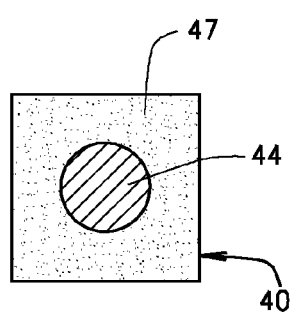
FIG. 12 is a transverse cross-sectional view of the pad of FIG. 11.

FIG. 11 is a perspective view of a variant of pad 40 for a listening clamp 10 according to a third embodiment. With the exception of pads 40, a listening clamp according to the third embodiment has a structure similar to the second embodiment.

Pad 40 comprises a flat part 42 solidly connected with a not shown mounting part. The mounting part is suitable for mounting to a jaw of the listening clamp 10 in order to mount pad 40 pivotally about an axis parallel to the pivoting axis between the jaws. A ball 44 is placed in contact with the flat part 42 on the opposite side of the mounting part. Another flat part 45 has a face in contact with ball 44 and another face intended to come into contact with the structure to be tested. The flat parts 42 and 45 are parallel at rest and the distance between them is therefore determined by the diameter of the ball 44. The volume delimited in dotted line between the flat parts 42 and 45 comprises an insert of elastomer material 47. Ball 44 is surrounded by the elastomer insert 47. The thickness of the elastomer insert 47 is equal to the diameter of the ball 44.

The flat part 45 has an important surface which facilitates the grip on the structure to be tested. Due to its spherical form, the ball 44 makes point contact with the flat part 45 and serves as collector for gathering vibration information independently of the orientation of pad 40 relative to this element. The flat part 42 and the mounting part serve to transmit the vibration information collected by ball 44 to a not shown accelerometer. The elastomer insert 47 holds the ball 44 in position between the flat parts 42 and 45. The insert 47 also connects the flat parts 42 and 45 together, while allowing a certain amount of pivoting between them. The insert also reduces the vibrations between the flat plates 42 and 45 so that the vibrations transmitted by ball 44 remain paramount. The insert 47 can be glued to the flat parts 42 and 45.

As in the preceding embodiment, the accelerometer is advantageously arranged plumb to the ball 44. For instance, the accelerometer can be arranged in a cylindrical cavity made in the mounting part and placed plumb to ball 44.

The ball 44 is advantageously made of stainless steel and its hardness is advantageously much greater than the hardness of flat parts 42 and 45. The flat parts 42 and 45 are advantageously made of an elastomeric material. The hardness of this elastomer material is greater than or equal to 40 Shore (D).

The elastomer material used for insert 47 has a distinctly lower hardness than plates 42 and 45. By preference, the hardness of the insert is less than 40 Shore (A).

The illustrated dimensions are intended to facilitate the understanding of the structure of pad 40, the size of the ball 44 and the thickness of insert 47 relative to the flat plates 42 and 45 are in reality distinctly smaller.

The listening clamp improves the sensing quality by using a collecting instrument that recovers vibrations from the element to be tested through the intermediary of a point contact. Furthermore, the listening clamp facilitates the vibration analysis performed during maintenance operations or after-sales service of automobiles, or facilitates the work of experts who can benefit from a quick investigation and analysis tool. Such a listening clamp additionally provides good frequency response, specifically between 0 and 4000 Hertz, while limiting the risk of an electrical short.

The invention claimed is:

1. A listening clamp for an acoustical vibration analysis tool, the listening clamp comprising a body formed of two arms hingedly connected and pivotable about an axis of articulation, each arm comprising a jaw at one end and a handle at another end, the arm further comprising a pad mounted in each jaw by means of a swiveling articulation such that the pad ensures contact between the listening clamp and a structure to be tested while decoupling the body from the structure; the listening clamp further comprising an accelerometer; at least one of the pads comprising a plate pivotally mounted to the jaw to which the at least one pad is mounted and a ball which is in contact with and protrudes from the plate, the ball being operative to collect the vibrations coming from the structure to be tested; said accelerometer being mounted to one of said at least one pad and said jaw.

2. The listening clamp according to claim 1, wherein a protruding part of the ball is in free air so as to come in contact with the structure to be tested.

3. The listening clamp according to claim 1, wherein the plate is a first plate; the pad further comprising a second plate having a first face in contact with the ball and a second, opposite, face which is intended to come in contact with the structure to be tested.

4. The listening clamp according to claim 3, wherein the ball makes point contact with first plate and second plate.

5. The listening clamp according to claim 4, wherein the ball is in contact with a flat face of the first pad, and the second plate is flat and parallel to said flat face of first pad.

6. The listening clamp according to claim 3, wherein the pad comprises an insert connecting the first plate and the second plate; said insert housing said ball.

7. The listening clamp according to claim 1, wherein the ball has a hardness at least 5 times greater than a hardness of the plate.

8. The listening clamp according to claim 1, wherein the accelerometer is mounted on the at least one pad.

9. The listening clamp according to claim 8, wherein the accelerometer is mounted on said plate plumb with said ball.

10. The listening clamp according to claim 1, wherein the listening clamp is made of rigid plastic material, so that its use cannot cause an electrical short circuit.

11. The listening clamp according to claim 1, wherein the pads are made of a hard plastic material.

12. The listening clamp according to claim 1, wherein the arms have perforated ribbing in order to make the clamp lighter, except that, at a median part of the arms proximate the axis of articulation, the arms are reinforced.

13. The listening clamp of claim 1 wherein said vibration sensor comprises an accelerometer.

14. An acoustical vibration analysis tool, comprising a plurality of listening clamps according to claim 1, a headset suitable for noisy environments, a microphone suitable for measuring airborne noise, and a selection box; said headset, said microphone, and the listening clamps each being equipped with plugs for connection to the selection box; the selection box being used by an operator to identify the listening clamp closest to the acoustical vibration phenomenon to be studied.

15. The acoustical vibration analysis tool according to claim 14, wherein the plurality of listening clamps are of the same size.

16. The acoustical vibration analysis tool according to claim 14 further including an accelerometer; said accelerometer being mounted to one of said jaw and said pad of said listening clamp.

* * * * *